May 17, 1955  W. F. ALBRECHT  2,708,702
LAMP BASE WELDING
Filed Aug. 28, 1952  3 Sheets-Sheet 1
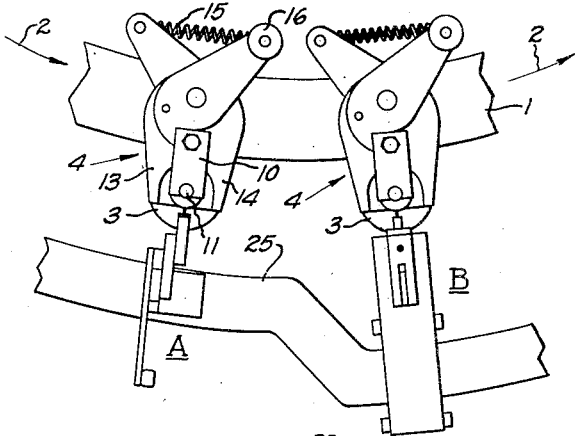
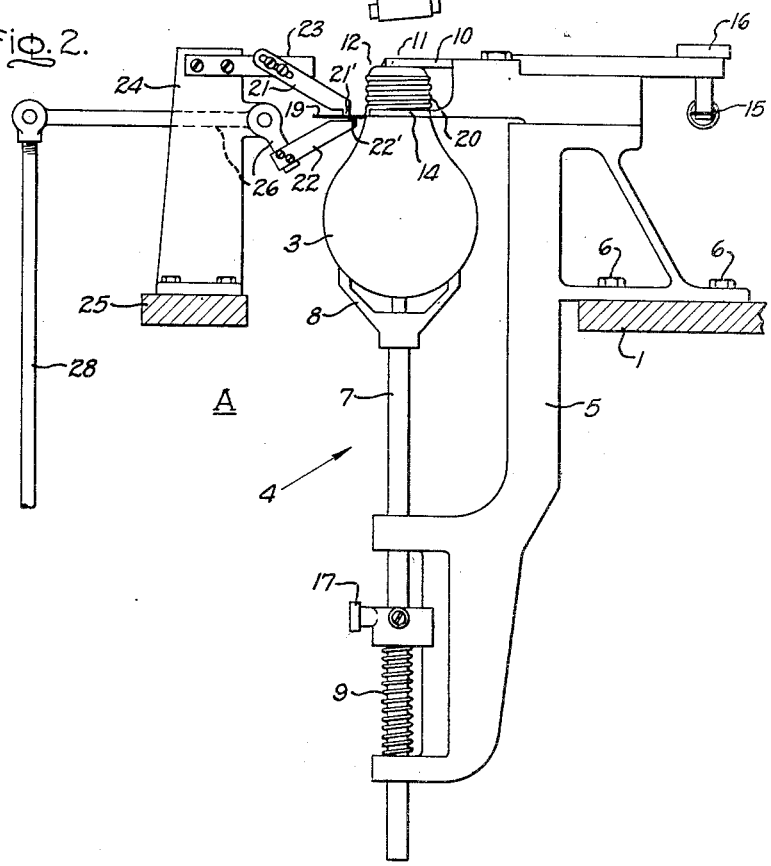
Inventor:
Warren F. Albrecht,
by [signature]
His Attorney.

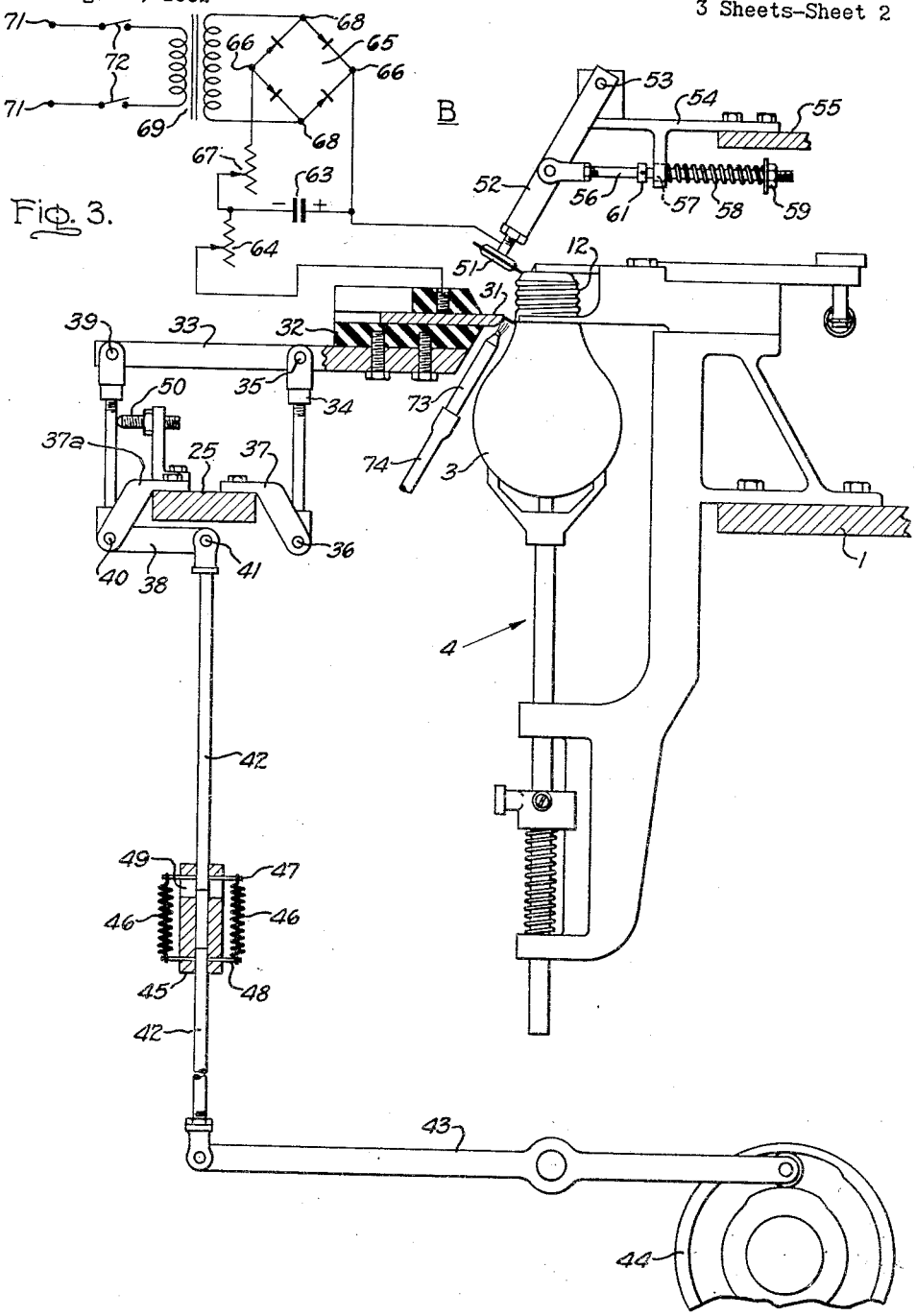

Inventor:
Warren F. Albrecht,
by Vernet C. Kauffman
His Attorney.

United States Patent Office 2,708,702
Patented May 17, 1955

2,708,702

LAMP BASE WELDING

Warren F. Albrecht, Euclid, Ohio, assignor to General Electric Company, a corporation of New York Application August 28, 1952, Serial No. 306,828

7 Claims. (Cl. 219—10)

This invention relates to the basing operation in the manufacture of electric lamps wherein a base is fastened to the constricted neck portion of the glass bulb and permanent electrical connections are made between the lead wires and the metal parts of the base.

Until fairly recently, the bases of electric lamps were almost universally made of brass which was readily tinned and soldered. Welding was used very little, and then almost only in the case of the larger sizes of lamps operating at high temperatures where solder might melt. Such welding as was used, was generally made following conventional techniques utilizing a fluxed welding rod, the whole being a relatively expensive procedure. Due to the scarcity and high cost of brass, it has now become highly desirable to use less expensive metals such as aluminum or steel for the bases of electric lamps, or at least for the shell of the base which comprises the greater portion of the metal in it, and these metals do not lend themselves well to soldering. Where a very reliable low resistance connection is required, a welded connection then becomes highly desirable. The present invention is an improvement over the welding method and apparatus described in copending application No. 263,456, filed December 26, 1951, of Conrad E. Bechard entitled "Electric Lamp," for making welded base connections such as claimed in the said application.

Accordingly the object of the present invention is to provide a new and improved method for welding the lead-in wires of electric lamps to the metal parts of their bases.

Another object of the invention is to provide apparatus adapted to operate in conjunction with prior lamp finishing machines for welding the side lead-in wire to the shell of the base in the commercial production of electric lamps.

In accordance with the invention, a weld may be effected between a lead wire and a metal part of a lamp base such as its shell through the following procedure. For instance, starting with a sealed bulb having a base seated on its neck and with the side lead-in wire drawn out between the edge of the shell and the seal shoulder, the lead-in wire is cut off to a short stub of substantial stiffness projecting a fraction of an inch from the edge of the base shell. The criteria to be observed in choosing the length of stub left protruding are the following. Firstly, the stub must be short enough to have the necessary stiffness for making a good contact with an electrode pressed against it. Secondly, since the wattage dissipated in the welding operation must be kept low in order to prevent excessive vaporization of metal with the resultant tendency to discolor and possibly crack the adjacent glass, the stub should be short in order not to require a high wattage to fuse it. Thirdly, the length of the stub must be such that when fused back into an approximately spherical globule welded to the edge of the base shell, the globule should not stick out excessively nor be so large as to be unsightly. Prior to the actual welding operation, a relatively low resistance connection must exist between the projecting stub and the metal part of the base to which it is to be welded: in the present instance of the side lead wire, this may be done by bending the stub up slightly so as to achieve a good contact connection at the root of the stub, that is, between the wire and the rim of the base at the point of emergence of the wire. Thereafter a relatively massive electrode is pressed against the end of the stub and a welding current having a drooping characteristic such as results from the discharge of a capacitor, is passed through the stub, the circuit being completed through the shell of the base and a suitable electrode contacting it. The massive electrode which contacts the lead wire is made negative so that it operates as a cathode at the instant when, the wire having fused, a spark is produced in the gap occurring between the electrode and the end of the wire.

For further objects and advantages and for a better understanding of the invention, attention is now directed to the following description and accompanying drawings. The features of the invention believed to be novel will be more particularly pointed out in the appended claims.

In the drawings:

Fig. 1 is a plan view showing a fragment of a prior art lamp finishing machine and various mechanisms operating in conjunction therewith for welding electric lamps in accordance with the invention.

Fig. 2 is a side view of a mechanism which cuts off the side lead wire and simultaneously bends it up against the edge of the shell.

Fig. 3 is a side elevation view of a welding mechanism with the electrical components of the welding circuit diagrammatically illustrated.

Figure 4A:
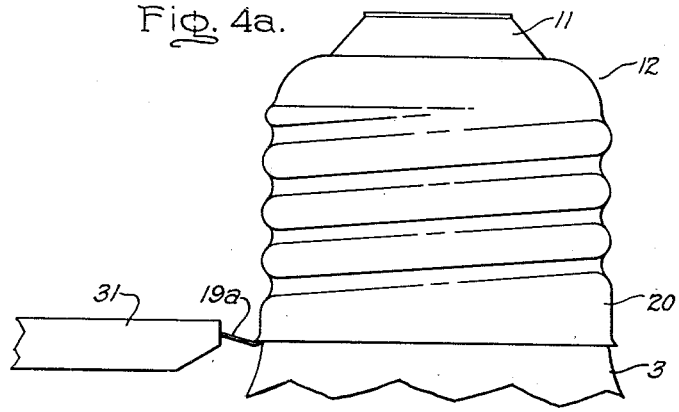

Figs. 4a, b, and c illustrate the sequence of events in the formation of the weld.

The invention will be described by references to a medium screw base of the type generally used for household incandescent lamps. It will be understood however that the invention is equally applicable to other lamps and to different sizes and types of bases, for instance to bayonet bases in which the side lead-in wire is connected to the straight-walled cylindrical shell of the base.

Referring to Fig. 1, the invention may be carried out through the use of the mechanisms located at stations A and B of a prior art lamp finishing machine whereof a fragment is illustrated in plan view. Such a machine is disclosed for instance in U. S. Patent 1,708,756, Fagan, and comprises a turret or turntable seen in part at 1, and suitable driving means (not shown in the drawing) for intermittently rotating the turret in a counter-clockwise direction as indicated by the curved arrows 2. The glass bulbs 3 are held neck up in holders or heads 4 which are fastened to the turret around its periphery, and the intermittent rotation of the turret advances the bulbs to successive work stations at each index.

As best seen in Fig. 2, each lamp holder or head 4 comprises a bracket 5 bolted at 6 to the periphery of the turret 1. The bracket has a dependent portion supporting a vertical spindle 7 which carries at its upper end a crow-foot shaped bulb cup 8. The spindle is urged upwards by the spring 9 causing the bulb cup to press up resiliently against the end of the bulb 3. On the upper portion of the bracket, there is provided a plate 10 which receives the end button or web 11 of the base 12, and a pair of pivotable holding jaws 13, 14 which are biased together by a tension spring 15. The lamp is held firmly in the holder and the base is pressed against the bulb neck by reason of the upward pressure exerted on the bulb by the bulb cup. At the same time, the jaws 13, 14 pressing against the sides of the base 12 assist in seating it squarely on the neck of the bulb. The jaws 13, 14 may be pivoted open to release the base by locating a cam to engage the roller 16 affixed to the rearwardly projecting portion of jaw 13 at the stations of the machine where opening is desired. The lamp itself is released from the head 4 by a cam which engages roller 17 on spindle 7 and forces it down to relieve the pressure of the bulb cup on the lower end of the bulb.

In accordance with the illustrated embodiment the first step in making a welded connection of the side lead-in wire to the edge of the base shell is to cut off the side lead-in wire 19 to a short length or stub, which, in the case of a 25 watt bulb for instance, may project approximately ⅛ inch beyond the side of the shell. The projecting stub is preferably bent up slightly above the horizontal while pointing radially outward so as to achieve a low resistance contact connection with the rim of the shell 20 of the base at the point where it emerges from between the shell and the neck of the bulb. All these preliminary operations may be performed simultaneously by the cutting and positioning mechanism located at station A of the machine. The mechanism comprises a pair of scissor type cutters 21 and 22 of which the upper cutter 21 is fixed in place on a bracket 23 fastened to a standard 24 which is bolted to a stationary frame member 25 of the machine. The lower cutter 22 is fastened on the projecting arm of a lever 26 which is hinged on the pedestal 24. The pivoting of lever 26 is achieved through a connecting rod 28 which is reciprocated vertically, in synchronism with the indexing movement of the machine. This may be done through a rocker arm and cam system such as is illustrated in Fig. 3.

During the time when the turret is rotating and advancing the bulbs from one station to the next, rod 28 is in a raised position so that the lower cutter 22 is pivoted down, thereby allowing the projecting lead wire 19 to enter between the upper and lower cutters. During the dwell interval of the turret, rod 28 is reciprocated down and the projecting lip portion 22' of the lower cutter slides up past the projecting lip portion 21' of the upper cutter and the lead wire is sheared off. At the same time, the continued upward movement or overtravel of lip 22' of the lower cutter bends the short remaining stub of lead wire up slightly above the horizontal so as to achieve a good mechanical contact to the shell of the base at the point of emergence of the stub. The end result of the operation, is to cut off and position the projecting stub 19a of the lead wire substantially as shown in Fig. 4a. The shearing operation also leaves the end of the lead wire in the condition of a fresh cut showing clean metal without any oxide thereon; this facilitates making a good contact to the welding electrode 31 when it is pressed against the stub.

Figure 4B:
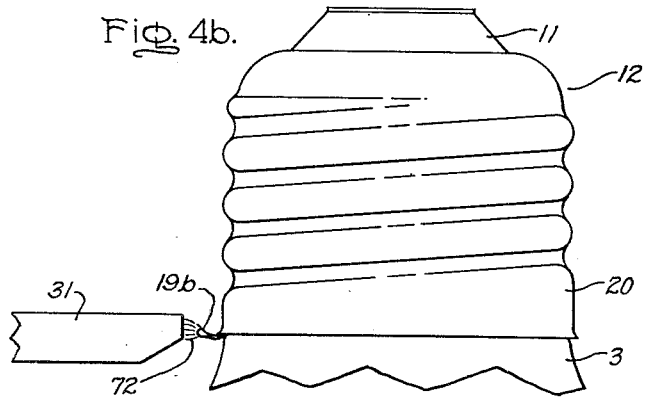

The actual welding operation is performed by the mechanism located at station B and illustrated in Fig. 3. The short projecting length or stub 19a of the lead wire, having been positioned as illustrated in Fig. 4a, is contacted by the end of a comparatively massive electrode 31 which is supported in a slot within an insulating block 32 fastened on the forward end of a plate 33. The qualification of electrode 31 as massive is made with relation to the size of the lead wire 19, as will be apparent upon inspection of Figs. 3 and 4. The composition of the electrode 31 is not critical and for example, electrodes of carbon, silver, copper and copper alloys, and also of tungsten have been used successfully. It has been observed however that the least pitting of the end of the electrode is achieved with an electrode composed of copper. The plate 33 is supported at its forward end on a crank 34 which is hinged at 35 to the plate, and at 36 to a bracket 37 secured to the stationary frame member 25 of the machine. At its rear end, the plate is supported by a bell crank 38 which is hinged to it at 39, and hinged at 40 to bracket 37a secured to the member 25. The offset portion of the bell crank has fastened to it at 41 a connecting rod 42 which is reciprocated vertically through the usual rocker arm and cam arrangement 43, 44, the cam being driven in synchronism with the driving means of the turret so as to advance the plate radially inwards toward the bulb to enable the electrode 31 to contact the lead wire during the dwell interval of a bulb at the station. The connecting rod 42 is in two parts which are linked together through a sleeve 45 and a pair of tension springs 46 connected between transverse pins 47 and 48 in the upper and lower sections of rod 42 respectively. The upper pin 47 is free to ride in a slot 49 in the sleeve 45. This arrangement allows a lost motion through limits determined by pin 47 and its cooperating slot 49 and permits overtravel of the lower section of the pull rod after the electrode has contacted the lead wire. An adjustable stop bolt 50 limits the movement of plate 33 towards the bulb 3.

To complete the welding circuit, the base shell is contacted at station B by a roller 51 which is rotatably fastened at the lower end of an inclined rod 52. Rod 52 is hinged at 53 on a bracket 54 fixed to a stationary frame member 55 of the machine. The roller 51 is pressed resiliently against the edge of the base shell by the inward pivoting of the arm 52 by means of pull rod 56 whereof the shank passes through an over-size hole at 57 in a dependent portion of the bracket 54. The portion of the pull rod projecting to the rear of the bracket is provided with a spring 58 which is compressed between the bracket and an end nut and washer 59. A stop ring 61 on the opposite side of the bracket from the spring limits the movement of the pull rod to prevent the roller 51 from swinging too far forward into the path of travel of the bulb holders.

In accordance with the invention, the weld is made by passing through the stub of lead wire a relatively small wattage in the form of a current starting off at a relatively high value and dropping off very quickly to a low value. In other words, the welding current has a drooping characteristic such as results from the exponential discharge of a condenser through a resistance. As illustrated schematically, a condenser 63 is arranged to be discharged through the lead wire, the connection being made directly from the positive side of the condenser to roller 51 which contacts the base shell, and from the negative side of the condenser, in series with an adjustable rheostat 64, to the electrode 31 which contacts the lead wire. The condenser 63 may have a value of approximately 2500 microfarads and the rheostat 64 may be adjustable between 0 and 10 ohms. For welding the side lead wire of a 25 watt lamp having a 12 mil copper side lead-in wire projecting a length of approximately ⅛ inch, the rheostat 64 may be set at approximately 8 ohms when the condenser 63 is charged to 200 volts at the beginning of the welding cycle. The condenser 63 may be recharged in between the welding operations through any conventional system. For instance, as illustrated in the drawing, the recharging means may comprise a full-wave bridge type rectifier 65 whereof one pair of conjugate points 66 is connected in series with a control rheostat 67 across capacitor 63, and whereof the other pair of conjugate points 68 is connected across the secondary winding of a step-up transformer 69. The primary winding of the transformer is energized from the usual 115 volts 60 cycle commercial supply at terminals 71 through a switch 72.

Figure 4C:
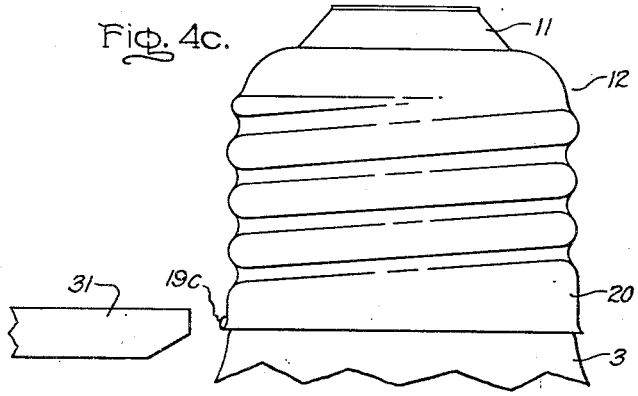

At the instant when the electrode 31 contacts the projecting length 19a of the lead wire, conditions are as illustrated in Fig. 4a. The condenser 63 begins to discharge immediately with a heavy current, for instance 20 amperes, through the lead wire. The maximum resistance in the circuit, exclusive of the control rheostat 64, occurs in the stub 19a of the lead wire. By reason of the low thermal mass of that length of wire, it is very rapidly raised to the fusion point. A small molten sphere thereupon forms on the end of the stub and enlarges as it withdraws away from the electrode towards the shell. This condition is illustrated at 19b in Fig. 4b. Simultaneously an arc forms in the copper vapor at 72 between the end of the electrode and the molten sphere. The formation of the arc assures the concentration of heat on the end of the lead wire so that it continues to fuse and to draw back towards the shell of the base. As the molten sphere becomes united to the edge of the base shell, the condenser 63 is by then sufficiently discharged that the arc extinguishes itself as illustrated in Fig. 4c. The molten sphere on the end of the wire thereupon melts the adjacent metal of the shell of the base and becomes intermingled with it as shown at 19c, thereby achieving a low resistance weld of the lead wire to the base shell and without any addition of welding metal from an extraneous source.

A precaution to be observed in the base welding of electric lamps by my improved method, is maintaining the welding wattage at a relatively low value. This is necessary to insure that an excessive quantity of lead wire metal is not vaporized and condensed on the neck of the bulb, thereby producing unsightly discoloration and possibly cracking due to overheating. As an additional safeguard, a shield may be positioned against the side of the bulb to protect it from the vapor and heat of the weld, or, as illustrated, a nozzle 73 supplied with air through tubing 74 may be positioned to direct an air jet upwards along the side of the bulb to blow the vapor away. Another precaution to be observed is to make the electrode 31 which contacts lead-in wire, the negative electrode so that it operates as the cathode during the occurrence of the arc upon the formation of the molten sphere on the end of the lead wire. If the polarity connections are reversed, the weld will be unsatisfactory.

Whereas I have described a mechanism which has been found suitable for welding the side lead wire of an electric lamp to the shell of the base in accordance with my invention, it will be understood that other mechanisms may be utilized to carry out my welding method. My welding method itself is of general applicability in the electric lamp manufacturing art wherever it is desired to weld a small wire to a thin metal part with which it is possible to establish a preliminary contact connection. For instance, the method may be used to weld the top lead wire of a lamp to the end contact or eyelet since it is possible to establish a preliminary contact connection between the lead and the eyelet at the point where the lead passes out through the hole in the eyelet. It will be appreciated of course that the specific lamp construction which has been illustrated is intended as a non-limitative example relative to the applicability of the method, and the scope of the invention is to be determined by the appended claims.

What I claim as new and desire to secure by Letters Patent of the United States is:

1. The method of welding a lead-in wire to a metal part of the base of an electric lamp which comprises the steps of cutting off the lead wire to a short stub of predetermined length having substantial stiffness and projecting laterally away from said metal part, making a preliminary low resistance contact connection between the root of the stub and said metal part, contacting the end of said stub with an electrode which is massive relative to said lead wire, and passing momentarily a current having a drooping characteristic through said metal part and said stub with said electrode negative in polarity and maintaining said electrode for the duration of the welding operation substantially in the position to which it was brought at the time of contacting the end of said stub so as to first form a molten bead on the end of the stub and simultaneously form an arc which continues to fuse the stub and cause it to draw back until it fuses to the said metal part of the base.

2. The method of welding a lead-in wire to a metal part of the base of an electric lamp which comprises the steps of cutting off the lead wire to a short stub of predetermined length having substantial stiffness and projecting laterally away from said metal part, making a preliminary low resistance contact connection between the root of the stub and said metal part, contacting the end of said stub with an electrode which is massive relative to said lead wire, and discharging a charged capacitor through said metal part and said stub with said electrode negative in polarity and maintaining said electrode for the duration of the welding operation substantially in the position to which it was brought at the time of contacting the end of said stub so as to first form a molten bead on the end of the stub and simultaneously form an arc which continues to fuse the stub and cause it to draw back until it fuses to the said metal part of the base.

3. The method of welding a lead-in wire to a metal part of the base of an electric lamp which comprises the steps of cutting off the lead wire to a stub of predetermined length short enough to have substantial stiffness and projecting laterally away from said metal part, bending said stub so as to press the root thereof against the edge of the metal part to achieve a preliminary low resistance contact connection therewith while leaving the stub to extend laterally from said metal part, contacting the end of said stub with an electrode which is massive relative to said lead wire, and discharging a charged capacitor through said metal part and said stub with said electrode negative in polarity and maintaining said electrode for the duration of the welding operation substantially in the position to which it was brought at the time of contacting the end of said stub so as to first form a molten bead on the end of the stub and simultaneously form an arc which continues to fuse the stub and cause it to draw back until it fuses to the said metal part of the base.

4. The method of welding the side lead-in wire to the metal shell of the base in an electric lamp wherein the wire emerges from between the neck of the bulb and the rim of the shell, which comprises the steps of cutting off the lead wire to leave a projecting stub of predetermined length having a clean oxide-free end and short enough to have substantial stiffness, bending the stub up towards the side of the shell to provide a preliminary low resistance contact connection between the root of the stub and the rim of the shell while leaving the stub to extend laterally from said shell, pressing an electrode which is massive relative to said lead wire against the end of the stub, and discharging a charged capacitor through the shell and the stub with said electrode negative in polarity during the discharge and maintaining said electrode for the duration of the welding operation substantially in the position to which it was brought at the time of contacting the end of said stub so as to first form a molten bead on the end of the stub and simultaneously form an arc which continues to fuse the stub and cause it to draw back until it fuses to the said shell of the base.

5. Lamp manufacturing apparatus comprising means for presenting a lamp bulb with a base thereon at successive work stations, means located at a station for cutting off at a predetermined point a lead wire projecting laterally from the side of the bulb at the rim of the base shell and leaving a stub of predetermined length and short enough to have substantial stiffness and means bending said stub in a direction to bring its root into firm contact with the rim of the base shell to achieve a low resistance contact connection therewith while leaving the stub to extend laterally away from said shell, an electrode which is massive relative to said lead wire, means at a successive station for bringing said electrode into contact with the end of said stub, another electrode at said successive station positioned to contact the base shell, a charged capacitor, means connecting said capacitor across said electrodes and with the negative side thereof connected to said massive electrode and means for restraining said massive electrode for the duration of the welding operation substantially at the position to which it was brought into contact with the end of said stub to permit formation of an arc which melts the said stub back onto said base shell.

6. Lamp manufacturing apparatus comprising means for presenting a lamp bulb with a base thereon at successive work stations, means located at a station for cutting off at a predetermined point a lead wire projecting laterally from the side of the bulb at the rim of the base shell and leaving a stub of predetermined length and short enough to have substantial stiffness and means bending said stub in a direction to bring its root into firm contact with the rim of the base shell to achieve a low resistance contact connection therewith while leaving the stub to extend laterally away from said shell, a first electrode which is massive relative to said lead wire, a radially movable support at a successive station for pressing said electrode against the end of said stub, a second electrode at said successive station disposed to contact the base shell, a capacitor connected across said electrodes, means for charging said capacitor with the side thereof connected to said massive electrode being negative in polarity and means for restraining said massive electrode for the duration of the welding operation substantially at the position to which it was brought into contact with the end of said stub to permit formation of an arc which melts the said stub back onto said base shell.

7. Lamp manufacturing apparatus comprising means for presenting at successive work stations a lamp bulb with a base thereon and a lead wire projecting laterally from the side of the bulb at the rim of the base shell, means at a station for severing said lead wire at a predetermined distance from the shell and leaving a stub short enough to have substantial stiffness, welding means at a successive station including an electrode which is massive relative to said lead wire, means for bringing said electrode into contact with the free end of said stub, another electrode at said successive station positioned to contact the base shell, a charged capacitor, means connecting said capacitor across said electrodes and with the negative side thereof connected to said massive electrode, and means for restraining said massive electrode for the duration of the welding operation substantially at the position to which it was brought into contact with the end of the stub, the welding means and the severing means being so correlated that an arc formed between said massive cathode and said stub is extinguished by discharging of the condenser when the predetermined length of stub has melted back and united with the base shell.

References Cited in the file of this patent

UNITED STATES PATENTS

| | | |
|---|---|---|
| 1,299,150 | Dyer | Apr. 1, 1919 |
| 1,489,093 | Mershon | Apr. 1, 1924 |
| 1,613,957 | Madden | Jan. 11, 1927 |
| 1,706,880 | Gustin | Mar. 26, 1929 |
| 2,159,916 | Vang | May 23, 1939 |
| 2,523,291 | Gilliver | Sept. 26, 1950 |

FOREIGN PATENTS

| | | |
|---|---|---|
| 558,472 | Great Britain | Jan. 6, 1944 |